(12) United States Patent
Chen et al.

(10) Patent No.: US 10,354,392 B2
(45) Date of Patent: Jul. 16, 2019

(54) IMAGE GUIDED VIDEO SEMANTIC OBJECT SEGMENTATION METHOD AND APPARATUS

(71) Applicant: BEIHANG UNIVERSITY, Beijing (CN)

(72) Inventors: Xiaowu Chen, Beijing (CN); Yu Zhang, Beijing (CN); Jia Li, Beijing (CN); Wei Teng, Beijing (CN); Haokun Song, Beijing (CN); Qinping Zhao, Beijing (CN)

(73) Assignee: Beihang University, Beijing (CN)

( * ) Notice: Subject to any disclaimer, the term of this patent is extended or adjusted under 35 U.S.C. 154(b) by 89 days.

(21) Appl. No.: 15/710,791

(22) Filed: Sep. 20, 2017

(65) Prior Publication Data

US 2018/0211393 A1 Jul. 26, 2018

(30) Foreign Application Priority Data

Jan. 24, 2017 (CN) .......................... 2017 1 0060268

(51) Int. Cl.
*G06T 7/194* (2017.01)
*G06T 7/11* (2017.01)
(Continued)

(52) U.S. Cl.
CPC .......... *G06T 7/194* (2017.01); *G06K 9/00744* (2013.01); *G06K 9/34* (2013.01);
(Continued)

(58) Field of Classification Search
CPC . G06T 7/11; G06T 7/143; G06T 7/174; G06T 7/194; G06K 9/00744; G06K 9/34; G06K 9/6201; G06K 9/6202
See application file for complete search history.

(56) References Cited

U.S. PATENT DOCUMENTS

2010/0239125 A1* 9/2010 Chang et al. ........ G06K 9/4652
382/103
2011/0293247 A1* 12/2011 Bhagavathy et al. .. G06T 7/174
386/278
(Continued)

FOREIGN PATENT DOCUMENTS

CN  105809672 A  7/2016
CN  106327469 A  1/2017

OTHER PUBLICATIONS

Lei Fan et al., "A Graph-based Framework for Video Object Segmentation and Extraction in Feature Space" 2015 IEEE International Symposium on Multimedia, (Mar. 28, 2016), pp. 266-271.
(Continued)

*Primary Examiner* — Andrew W Johns
(74) *Attorney, Agent, or Firm* — J.C. Patents

(57) ABSTRACT

The disclosure involves an image guided video semantic object segmentation method and apparatus, locate a target object in a sample image to obtain an object sample; extract a candidate region from each frame; match multiple candidate regions extracted from the each frame with the object sample to obtain a similarity rating of each candidate region; rank the similarity rating of each candidate region to select a predefined candidate region number of high rating candidate region ranked by the similarity; preliminarily segment a foreground and a background from the selected high rating candidate region; construct an optimization function for the preliminarily segmented foreground and background; solve the optimization function to obtain a optimal candidate region set; and propagate a preliminary foreground segmentation corresponding to the optimal candidate region to an entire video to obtain a semantic object segmentation of the input video.

10 Claims, 5 Drawing Sheets

(51) Int. Cl.

| | |
|---|---|
| *G06T 7/174* | (2017.01) |
| *G06T 7/143* | (2017.01) |
| *G06K 9/34* | (2006.01) |
| *G06K 9/38* | (2006.01) |
| *G06K 9/46* | (2006.01) |
| *G06K 9/00* | (2006.01) |
| *G06K 9/62* | (2006.01) |

(52) U.S. Cl.
CPC ............. *G06K 9/38* (2013.01); *G06K 9/4604* (2013.01); *G06K 9/6202* (2013.01); *G06T 7/11* (2017.01); *G06T 7/143* (2017.01); *G06T 7/174* (2017.01); *G06T 2207/10016* (2013.01)

(56) References Cited

U.S. PATENT DOCUMENTS

| | | | |
|---|---|---|---|
| 2014/0002746 A1* | 1/2014 | Bai et al. ................. | H04N 5/21 348/607 |
| 2016/0286272 A1* | 9/2016 | Thapliya et al. .. | H04N 21/4668 |
| 2016/0379055 A1 | 12/2016 | Loui et al. | |
| 2016/0379371 A1* | 12/2016 | Chen et al. .......... | G06K 9/4604 382/173 |

OTHER PUBLICATIONS

Yuhang Wang et al., "Objectness-aware Semantic Segmentation" Proceedings of the 24th ACM international conference on Multimedia, (Oct. 2016), pp. 307-311.

* cited by examiner

IMAGE GUIDED VIDEO SEMANTIC OBJECT SEGMENTATION METHOD AND APPARATUS

CROSS-REFERENCE TO RELATED APPLICATION

This application claims priority to Chinese Patent Application No. 201710060268.8, filed on Jan. 24, 2017, which is hereby incorporated by reference in its entirety.

TECHNICAL FIELD

The disclosure relates to the field of computer vision and multimedia analysis and, in particular, to an image guided video semantic object segmentation method and apparatus.

BACKGROUND

As computer vision and multimedia analysis technologies evolve, multimedia information resource, which are characterized by being intuitive and vivid, are becoming increasingly accessible, diversified, and publicly popular. As a result, the means to efficiently locate and separate needed video resource from video information has also become a hot research topic.

The video semantic object segmentation is a technology that, for a specific semantic category, locates and separates video pixels of objects that fall under such category from within an input video. The technology is applicable to massive Internet analysis, video editing for film making, and video-based 3D modeling, etc. Existing video semantic object segmentation methods are mostly parameterized methods which involve labeling each single location where an object is located in a video, collecting mass image video in which object locations or contours have been labeled, learning from the collection a coherent vision model represented by parameters, and applying the vision model to an input test video by performing object segmentation for target objects in the input test video based on the vision model thus learned. For example, Kundu et al. from Georgia Institute of Technology proposed a method based on feature space optimization for semantic video segmentation, which is a parameterized method that obtains a vision model by feeding massive quantities of accurately labeled video frames into a learning convolutional neural network. Lei et al. from University of Michigan proposed, in 2016, a machine learning model recurrent temporal deep field, and applied the same to video semantic object segmentation. However, such parameterized methods are disadvantageous in that, on one hand, the use of parameterized methods requires accurately labeling mass images to obtain training samples, which can be a difficult and time consuming process; and on another hand, it is difficult to efficiently update and iterate such parameterized models obtained through such training according to newly added images, a fact that suggests suboptimal adaptation to dynamic growth in vision resources. For example, if new training samples or semantic categories are added to an existing vision system, a parameterized method will have to re-train its vision model, which will be a laborious and tedious procedure that, for modern machine learning models, could take days or even weeks.

SUMMARY

This disclosure provides an image guided video semantic object segmentation method and apparatus. The method, which can be categorized as a non-parameterized video semantic object segmentation method, is based on a sample image set with merely semantic category labels to obtain an object sample, and involves performing semantic object segmentation for an input video according to the object sample. Compared with prior art parameterized methods, this disclosure can sufficiently leverage weakly labeled image collections that are widely found on the Internet, instead of having to accurately label the training samples as in parameterized methods. By establishing a match between an input video and an image collection and locating semantic objects in the video, training process for the vision model can be omitted, while image collection dynamic growth can be supported, thereby realizing a simple and efficient semantic object segmentation for the video.

The disclosure provides an image guided video semantic object segmentation method, including:

locating, according to a given semantic category, a target object corresponding to the semantic category in a sample image to obtain an object sample;

extracting a candidate region from each frame in an input video;

matching, according to the object sample, multiple candidate regions extracted from the each frame with the object sample to obtain a similarity rating of each candidate region;

ranking the similarity rating of each candidate region in each frame to select a predefined candidate region number of high rating candidate region ranked by the similarity rating from high to low;

preliminarily segmenting a foreground and a background from the selected high rating candidate region;

constructing an optimization function for the preliminarily segmented foreground and background based on a consistent and unambiguous constraint for the foreground and background after the preliminary segmentation, and solving the optimization function to obtain a optimal candidate region set; and propagating a preliminary foreground segmentation corresponding to the optimal candidate regions to an entire video to obtain a semantic object segmentation of the input video.

The disclosure further provides an image guided video semantic object segmentation apparatus, including:

a locating module, configured to locate, according to a given semantic category, a target object corresponding to the semantic category in a sample image to obtain an object sample;

an extracting module, configured to extract a candidate region from each frame in an input video;

a matching module, configured to match, according to the object sample, multiple candidate regions extracted from the each frame with the object sample to obtain a similarity rating of each candidate region;

a ranking module, configured to rank the similarity rating of each candidate region in each frame to select a predefined candidate region number of high rating candidate region ranked by the similarity rating from high to low;

a processing module, configured to preliminarily segment a foreground and a background from the selected high rating candidate region;

a calculating module, configured to construct an optimization function for the preliminarily segmented foreground and background based on a consistent and unambiguous constraint for the foreground and background after the preliminary segmentation, and solve the optimization function to obtain a optimal candidate region set; and a propagating module, configured to propagate a preliminary foreground segmentation corresponding to the optimal candidate region to an entire video to obtain a semantic object segmentation of the input video.

The disclosed image guided video semantic object segmentation method and apparatus locate, according to a given semantic category, a target object corresponding to the semantic category in a sample image to obtain an object sample; extract a candidate region from each frame in an input video; match, according to the object sample, multiple candidate regions extracted from the each frame with the object sample to obtain a similarity rating of each candidate region; rank the similarity rating of each candidate region in each frame to select a predefined candidate region number of high rating candidate region ranked by the similarity rating from high to low; preliminarily segment a foreground and a background from the selected high rating candidate region; construct an optimization function for the preliminarily segmented foreground and background based on a consistent and unambiguous constraint for the foreground and background after the preliminary segmentation, and solve the optimization function to obtain a optimal candidate region set; and propagate a preliminary foreground segmentation corresponding to the optimal candidate regions to an entire video to obtain a semantic object segmentation of the input video. Rather than having to train a vision model, this solution sufficiently leverages weakly labeled image collections, which are widely found on the Internet, to replace accurately labeled training samples that are required in traditional methods, thereby eliminating the model training process, better supporting image set dynamic growth, and producing semantic object segmentation result for an input video efficiently and accurately.

DETAILED DESCRIPTION

In order to make objectives, technical solutions and advantages of embodiments of the present disclosure clearer, the technical solutions in the embodiments of the present disclosure will be described hereunder clearly and completely with reference to accompanying drawings. Obviously, the described embodiments are only a part of embodiments of the present disclosure, rather than all of them. Any and all other embodiments obtained by persons of ordinary skill in the art based on the presently disclosed embodiments without making any creative effort shall fall into the protection scope of the present disclosure.

Figure 1:
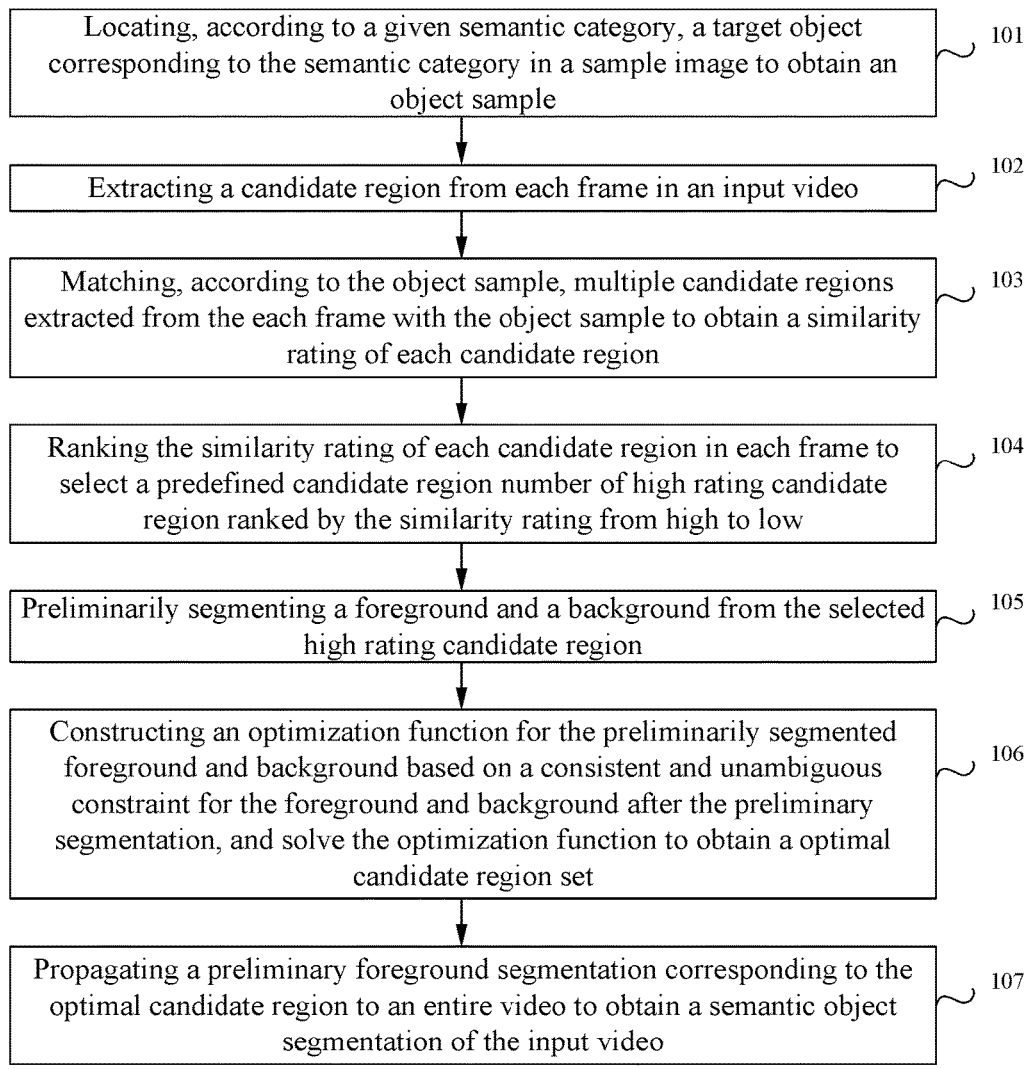
FIG. 1 is a schematic flowchart illustrating an image guided video semantic object segmentation method according to an exemplary embodiment of this disclosure.

FIG. 1 is a schematic flowchart illustrating an image guided video semantic object segmentation method according to an exemplary embodiment of this disclosure. As depicted in FIG. 1, the image guided video semantic object segmentation method illustrated in this embodiment includes:

Step 101: locating, according to a given semantic category, a target object corresponding to the semantic category in a sample image to obtain an object sample.

Figure 2A:
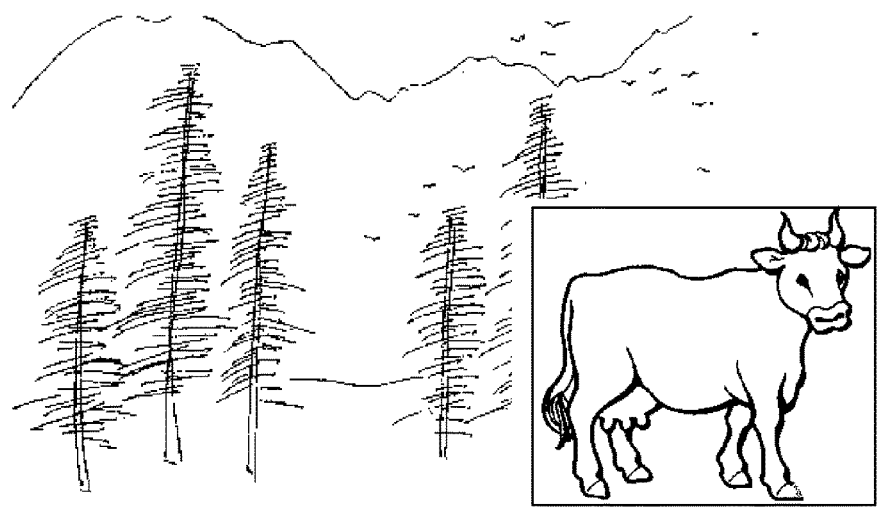
FIGS. 2a and 2b are schematic diagrams illustrating object sample for the embodiment depicted in FIG. 1.
Figure 2B:
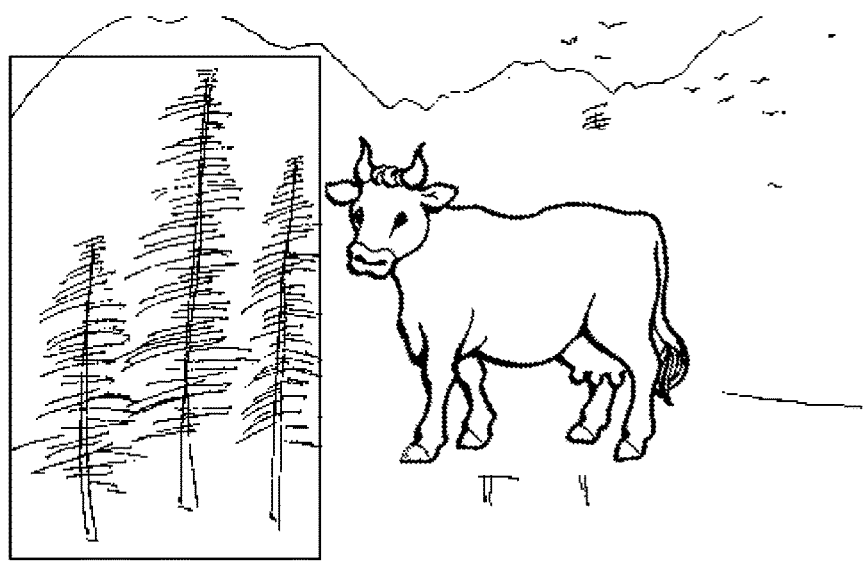

In particular, the target object is co-located in mass images containing the semantic category object according to a semantic category given in advance, thus constructing the object sample. For example, for the images depicted in FIGS. 2a and 2b, the semantic category is presumed to be "Cattle". According to the semantic category "Cattle", any target object that can be categorized as "Cattle" is located in FIGS. 2a and 2b, respectively, producing locating results as shown in the rectangular boxes in FIGS. 2a and 2b, respectively. It should be noted that the object samples obtained through such locating can, although based on the semantic category "Cattle", include wrong hits, as exemplified in FIG. 2b where the image of a "Tree" is erroneously located as an image of "Cattle". The target image can be located using any existing co-locating method, e.g. a probabilistic Hough matching co-locating algorithm proposed by Cho et al. from the WILLOW joint research laboratory of National Information and Automation Institute of France (Institut national de recherche en informatique et en automatique), Advanced Engineering College of Paris (École Normale Supérieure de Paris) and National Science Research Centre of France (Centre National de la Recherche Scientifique) in 2015. The algorithm starts from extracting mass candidate rectangular regions from each image, proceeds to calculating a co-saliency for each rectangular region, and selecting a region with the highest co-saliency in each image as the object sample. The process is completely automatic, and hence there may be imprecisely or even wrongly located objects.

Step 102: extracting a candidate region from each frame in an input video.

Figure 3:
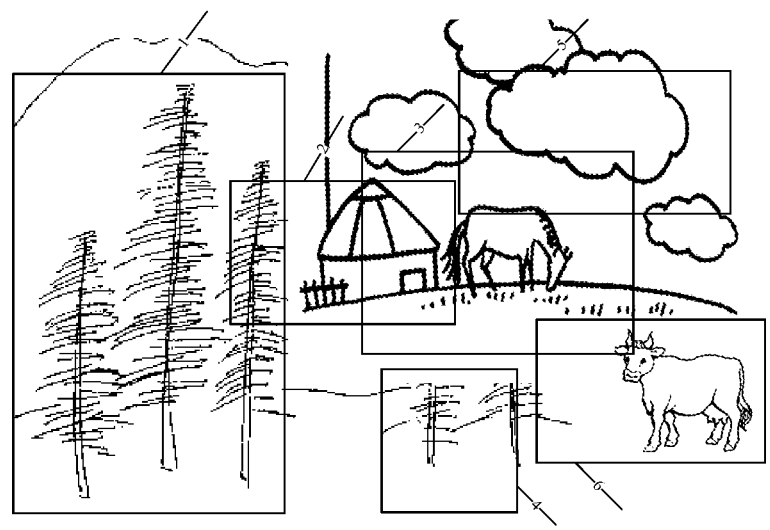
FIG. 3 is a schematic diagram illustrating a video frame for the embodiment depicted in FIG. 1.

As depicted in FIG. 3, which is assumed to be one of the image frames of an input video, candidate regions are extracted from each frame image according to predefined candidate region selecting algorithm, and are indicated in the rectangular boxes (which are indicated by reference numbers 1-6) in FIG. 3. The candidate region extraction does not require any given semantic category, and candidate regions are randomly selected.

Step 103: matching, according to the object sample, multiple candidate regions extracted from the each frame with the object sample to obtain a similarity rating of each candidate region.

In particular, for an input video labeled with same semantic category, a candidate region set is extracted from each frame. For a previously obtained object sample, each candidate region is matched with the object sample. Using space context correspondence between the matched region and the image object sample, the candidate region set of the video frame is rapidly rated. As depicted in FIG. 3, after the matching process, candidate region better matched with the object sample "Cattle" in FIG. 2a receives higher similarity rating. For instance, the candidate region with reference number 6 has the highest rating. Since there is a wrong object sample in FIG. 2b, the candidate region with reference number 1 may also have a relatively high rating. Each of the candidate regions in FIG. 3 are rated based on their similarities.

Step 104: ranking the similarity rating of each candidate region in each frame to select a predefined candidate region number of high rating candidate region ranked by the similarity rating from high to low.

According to the number of predefined candidate regions, several high rating candidate regions in the video frame are selected to receive subsequent procedures.

Step 105: preliminarily segmenting a foreground and a background from the selected high rating candidate region.

Step 106: constructing an optimization function for the preliminarily segmented foreground and background based on a consistent and unambiguous constraint for the foreground and background after the preliminary segmentation, and solve the optimization function to obtain a optimal candidate region set.

In particular, foreground and background preliminary segmentations are constructed for each of the high rating candidate regions. Combining consistency and unambiguity constraints for the segmentation, an optimal object region set is selected from the candidate region set. Considering possible errors in matching the video with the object sample, as well as potential inaccuracies in the image object sample, a candidate region with the highest rating does not always lead to a precisely located video object. Hence, this step leverages the consistency and unambiguity in video segmentation to jointly optimize the video frames to select the correct candidate regions, producing an optimal candidate region set.

Step 107: propagating a preliminary foreground segmentation corresponding to the optimal candidate region to an entire video to obtain a semantic object segmentation of the input video.

The image guided video semantic object segmentation method of this embodiment locates, according to a given semantic category, a target object corresponding to the semantic category in a sample image to obtain an object sample; extracts a candidate region from each frame in an input video; match, according to the object sample, multiple candidate regions extracted from the each frame with the object sample to obtain a similarity rating of each candidate region; ranks the similarity rating of each candidate region in each frame to select a predefined candidate region number of high rating candidate region ranked by the similarity rating from high to low; preliminarily segments a foreground and a background from the selected high rating candidate region; constructs an optimization function for the preliminarily segmented foreground and background based on a consistent and unambiguous constraint for the foreground and background after the preliminary segmentation; solves the optimization function to obtain a optimal candidate region set; and propagates a preliminary foreground segmentation corresponding to the optimal candidate regions to an entire video to obtain a semantic object segmentation of the input video. Rather than having to train a vision model, this solution sufficiently leverages weakly labeled image collections, which are widely found on the Internet, to replace accurately labeled training samples that are required in traditional methods, thereby eliminating the model training process, better supporting image set dynamic growth, and producing semantic object segmentation result for an input video efficiently and accurately.

Figure 4:
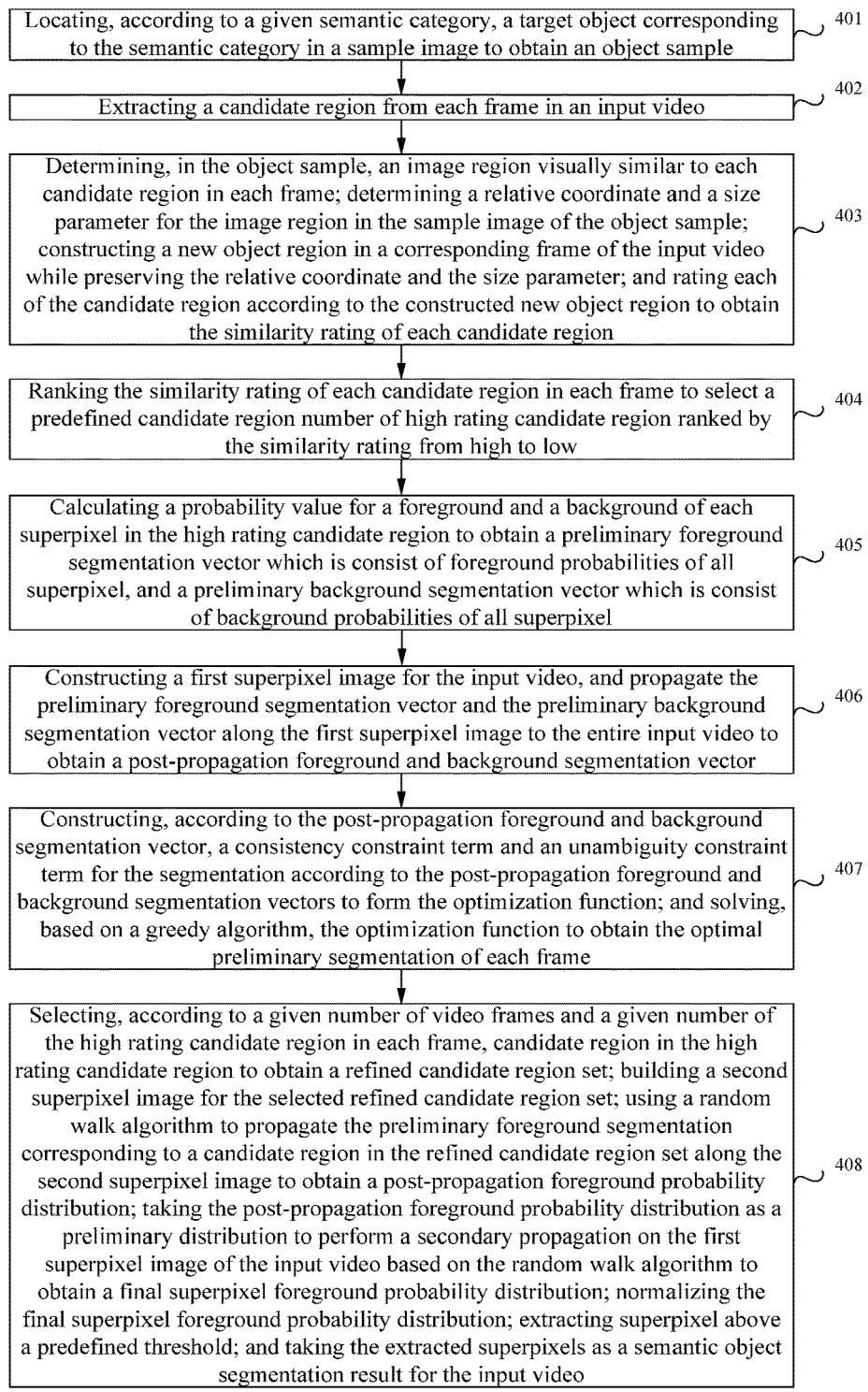
FIG. 4 is a schematic flowchart illustrating an image guided video semantic object segmentation method according to another exemplary embodiment of this disclosure.

FIG. 4 is a schematic flowchart illustrating an image guided video semantic object segmentation method according to an exemplary embodiment of this disclosure. As depicted in FIG. 4, further, on the basis of the aforementioned embodiment, the image guided video semantic object segmentation method illustrated in this embodiment particularly includes:

Step 401: locating, according to a given semantic category, a target object corresponding to the semantic category in a sample image to obtain an object sample.

Step 402: extracting a candidate region from each frame in an input video.

In particular, the candidate regions may be extracted using geodesic object proposals introduced by Philipp Krähenbühl and Vladlen Koltun from Stanford University in 2014.

Step 403: determining, in the object sample, an image region visually similar to each candidate region in each frame; determining a relative coordinate and a size parameter for the image region in the sample image of the object sample; constructing a new object region in a corresponding frame of the input video while preserving the relative coordinate and the size parameter; and rating each of the candidate region according to the constructed new object region to obtain the similarity rating of each candidate region.

In particular, for each candidate region in a video frame, an image region visually similar to the region is rapidly found in the object sample. While preserving the relative coordinate and the size correspondence between the matched image region and the object sample, a new object region is constructed over the original input video. In this way, mass object regions can be constructed. Due to inaccuracies or errors in the image object sample, there are also inaccuracies in some of the constructed object regions. To eliminate undesirable effects resulted from this problem, this disclosure rates each candidate region using the mass object regions obtained via migrating (i.e. the new object regions). This step effectively attacks, from two sides, the issues associated with inaccurate or erroneous object samples. One, by making use of information of the video frame itself, the extract candidate regions can typically fit very tightly around the object boundaries. Two, rating with mass object samples (i.e. the new object regions) can have enhanced robustness in situations where a small proportion of samples are inaccurate.

The similarity rating is, in particular, calculated as the following. For a candidate region W in a candidate region set W extracted from the video frame, a matching is performed using a KD tree algorithm to obtain a number K of most visually similar image regions. For an k-th matched region $P_k(W)$, preserve the relative coordinate and size correspondence between the region and the image object sample $O_k(W)$ containing the region, and construct a new object region location $e_k(W)$ over the original video frame. Finally, a number K|W| of object samples can be constructed. Each candidate region is rated using the equation below. For instance, the candidate region W has a rating of:

$$s(W) = a(W) \sum_{k=1}^{K} \sum_{W_0 \in W} q(W_0) \kappa(x(W), e_k(W_0)),$$

where a(W) represents the visual similarity of region W against the object sample, and is defined as:

$$a(W) = \frac{1}{K} \sum_{k=1}^{K} \exp\left(-\frac{(d(W) - d(O_k(W)))^2}{\delta_f}\right),$$

where d(W) represents a visual feature vector for the region. In this disclosure, the output from layer fc7 of a VGG deep network is taken as the feature. The denominator $\delta_f$ in the brace is a constant value, typically evaluated at the average of the numerators. The above equation indicates an average similarity between the region W and the first K of the most similar object samples. q(W$_O$) indicates the migratability of region W$_O$ (i.e. the new object region), and is defined in connection with local space context correspondence. Particularly speaking, if an object location obtained by migrating the region is relatively similar to an object location obtained by migrating neighboring region of the region, the region has a relatively high migratability. q(W$_O$) is defined as:

$$q(W_0) = \frac{\sum_{k=1}^{K} c(P_k(W_0))}{Z_c} \cdot \frac{r(W_0)}{Z_r} \cdot \frac{n(W_0)}{Z_n},$$

where $$r(W_0) = \sum_{k=1}^{K} \exp\left(-\frac{\|e_k(W_0) - \overline{e}(¥(W_0))\|^2}{\delta_r}\right), \text{ and}$$

$$n(W_0) = \sum_{\substack{N \in ¥(W_0) \\ 1 \le k \le K}} \exp\left(-\frac{\|e_k(W_0) - \overline{e}(¥(W_0))\|^2}{\delta_n}\right).$$

In the above equation, $P_k(W_0)$ represents an k-th matched region of region $W_0$; c is the credibility of the matched region and is obtained as an outcome from the probabilistic Hough matching algorithm; $¥(W_0)$ is a set of neighboring region of the region $W_0$; $\overline{e}(¥(W_0))$ represents an average for object locations by migrating the neighboring region set $¥(W_0)$. $\delta_r$ and $\delta_n$ are Gaussian kernel control parameters and may be set to the average of corresponding numerators; $Z_c$, $Z_r$ and $Z_n$ are normalization constants that fulfill $Z_c=Z_r=K$ and $Z_n=K|W|$. $\kappa(x(W), e_k(W_0))$ represents the similarity between region W and an object location obtained via migrating. It is defined as:

$$\kappa(x(W), e_k(W_0)) = \exp\left(-\frac{(x(W) - e_k(W_0))^2}{\delta_k}\right),$$

where the object location is represented by a 5-dimension vector, including horizontal and vertical coordinates of the center point, width, height and scale (i.e. the square root of its area) of the encasing rectangle thereof. When using the above form of Gaussian kernel, the rating s(W) of a candidate region can be considered as a bilateral filtering process. Using a convolution algorithm suggested by Philipp Krähenbühl and Vladlen Koltun from Stanford University in 2011, all candidate regions can be rated within a linear period.

Step 404: ranking the similarity rating of each candidate region in each frame to select a predefined candidate region number of high rating candidate region ranked by the similarity rating from high to low.

Step 405: calculating a probability value for a foreground and a background of each superpixel in the high rating candidate region to obtain a preliminary foreground segmentation vector which is consist of foreground probabilities of all superpixel, and a preliminary background segmentation vector which is consist of background probabilities of all superpixel.

In particular, for all candidate regions (i.e. the candidate region set) of a t-th frame of the input video and their ratings, a non-maximal suppression algorithm is leveraged to obtain a small number of high rating candidate region sets $L_t$ with relatively less mutually overlapping regions. For each high rating candidate region $L \in L_t$, a foreground/background preliminary segmentation is constructed. A foreground (background) segmentation means assigning a foreground (background) probability value for each superpixel in the video. For each superpixel S in the video, a foreground segmentation is constructed by:

$$f_0(L, S) = \sum_{L_0 \in I(L)} 1[S \in M(L_0)]o(L_0),$$

where I(L) is a candidate region set in which at least 50% of the area is covered by L; $M(L_0)$ is a superpixel set contained in region $L_0$; $o(L_0)$ is an objectiveness rating of region $L_0$, which is obtained as an outcome from the geodesic object proposals algorithm. The background preliminary segmentation is about evaluating superpixels that belong to $M(L_0)$ at 0, or at 1 if otherwise. Foreground (background) probability values for all superpixels are joined to create a preliminary foreground and background segmentation vector, denoted as preliminary foreground segmentation vector $f_0(L)$ and preliminary background segmentation vector $b_0(L)$, respectively.

Step 406: constructing a first superpixel image for the input video, and propagate the preliminary foreground segmentation vector and the preliminary background segmentation vector along the first superpixel image to the entire input video to obtain a post-propagation foreground and background segmentation vector.

In particular, a superpixel image (i.e. the first superpixel image) is constructed for the video. Each superpixel is matched with superpixels in object regions from other frames, and adjacency correspondence is established with 9 superpixels with the highest match ratings. During the matching process, visual feature of the superpixels are represented by color histograms and gradient histograms. The preliminary foreground and background segmentation vectors $f_0(L)$ and $b_0(L)$ are propagated along the video superpixel image (i.e. the first superpixel image) to all frames. The propagation process leverages a manifold ranking algorithm to obtain post-propagation foreground and background segmentations f(L) and b(L).

Step 407: constructing, according to the post-propagation foreground and background segmentation vector, a consistency constraint term and an unambiguity constraint term for the segmentation according to the post-propagation foreground and background segmentation vectors to form the optimization function; and solving, based on a greedy algorithm, the optimization function to obtain the optimal preliminary segmentation of each frame.

In particular, in connection with the consistency and unambiguity of the segmentation, the optimization function is solved as the following:

$$\max_{L^\mu \subseteq \bigcup_{t=1}^{T} L_t} \psi_a(L^\mu) + \lambda_d \psi_d(L^\mu) - \lambda_c \psi_c(L^\mu), \text{ s.t. } \forall\, t, |L^\mu \cap L_t| \le 1, |L^\mu| > \gamma T,$$

where $L_t$ ($1 \le t \le T$) represents a high rating candidate region set in frame t;

$$\psi_d(L^\mu) = \frac{1}{T} \sum_{L \in L^\mu} s(L)$$

is the rating for the selected object region; and $\psi_a$ and $\psi_c$ represent an unambiguity constraint term and a consistency constraint term, respectively. The condition that the solving process is required to fulfill is: at most one region is selected from a candidate region set $L_t$ of each frame; and a given proportion γ (which is between 0 and 1, and set at 0.7 in this disclosure) of the total number of video frames shall be taken up by the total number of selected object regions. At this time, the unambiguity constraint term $\psi_a$ may be defined as the difference between each superpixel foreground and background probability values:

$$\psi_a(L^\mu) = \frac{1}{|S||L|} \sum_{L \in L^\mu} \|g(L)\|_1, \text{ where}$$

$$g(L) = \frac{f(L)}{1^T f_0(L)} - \frac{b(L)}{1^T b_0(L)},$$

where |S| is the number of superpixels. The consistency constraint term $\psi_c$ is defined as:

$$\psi_c(L^\mu) = \frac{1}{|S|} \sum_{L,L_0 \in L^\mu} \|h(L, L_0)e(g(L) - g(L_0))\|_1,$$

where $h(L,L_0)$ is a weighing vector that is constructed by taking the absolute value of each component of $g(L)$ and $g(L_0)$, and taking the smaller component at the same location of the vector. The operator e indicates pointwise multiplication of the components of the two vectors. Considering the challenge in solving the above problem, the $\psi_a(L^\mu)$ is firstly replaced by its upper bound $$\psi'_a(L^\mu) = \frac{1}{|S|} \sum_{S \in S} \max_{L \in L^\mu} \|f(L, S) - b(L, S)\|_1.$$

Now, the problem can be considered as a submodular maximization problem defined on a partition matroid, for which a preferred approximate solution can be obtained via a greedy algorithm as the following. The algorithm reiterates for a number of T times, and during its t-th run: 1) select, in a t-th frame, a candidate region with the highest rating, and add the region into the optimal object region set; 2) select, on an unselected frame, a high rating candidate region which can maximize the gain for the target function; and 3) repeat step 2) until more than γT regions have been selected. T runs will produce T groups of solutions, among which the group with the largest target function value is taken as the optimal solution.

Step 408: selecting, according to a given number of video frames and a given number of the high rating candidate region in each frame, candidate region in the high rating candidate region to obtain a refined candidate region set; building a second superpixel image for the selected refined candidate region set; using a random walk algorithm to propagate the preliminary foreground segmentation corresponding to a candidate region in the refined candidate region set along the second superpixel image to obtain a post-propagation foreground probability distribution; taking the post-propagation foreground probability distribution as a preliminary distribution to perform a secondary propagation on the first superpixel image of the input video based on the random walk algorithm to obtain a final superpixel foreground probability distribution; normalizing the final superpixel foreground probability distribution; extracting superpixel above a predefined threshold; and taking the extracted superpixels as a semantic object segmentation result for the input video.

In particular, the refined candidate region set contains high rating candidate regions at a number equals to a product of the given number of video frames and the given number of the high rating candidate regions in each frame. The given number of video frames can be determined according to the γ in step 207, which means the total number of selected object regions shall take up a given proportion γ (which is between 0 and 1, and set at 0.7 in this disclosure) of the total number of video frames. A superpixel image is constructed on the selected object region set. The given number of high rating candidate regions in each frame shall be one or more, but less than the predefined number threshold for the high rating candidate region in Step 204. In particular, each superpixel is matched with superpixels in object regions from other frames, and adjacency correspondence is established with 9 superpixels with the highest match ratings. During the matching process, visual feature of the superpixels are represented by color histograms and gradient histograms. Taking the foreground segmentation corresponding to the selected object region as the preliminary foreground probability of the superpixel, propagation is performed on the superpixel image using a random walk algorithm to obtain a post-propagation foreground probability distribution. Then, with the post-propagation superpixel foreground probability distribution being taken as a preliminary distribution, a secondary propagation is again performed on the superpixel image of the input video using the random walk algorithm to obtain a final superpixel foreground probability distribution. The superpixel foreground probability distribution is normalized into a range from 0 to 1, and superpixels above a certain threshold are isolated and taken as the target video object segmentation result. In this disclosure, the threshold is set at 0.2. Through the above two propagation runs, a more meticulous video segmentation result is obtained as a result of propagating in the optimally selected candidate regions, and in turn the segmentation result to the entire video region. An even more meticulous segmentation result is obtained as compared against the first propagation to the entire video.

The image guided video semantic object segmentation method disclosed in this embodiment includes: co-locating an object sample in mass images containing objects of a given semantic category; extracting a candidate region set from each frame, and matching the candidate region set with an image region; leveraging space context correspondence between the matched regions and the image object samples to rapidly rate the candidate region set of the video frame; constructing a foreground and background preliminary segmentation for each of the high rating candidate regions; combining consistency and unambiguity constraints for the segmentation to select an optimal object region set from the candidate region set; and using a two stage random walk algorithm to propagate a preliminary foreground segmentation corresponding to the optimal candidate regions to an entire video to obtain a final segmentation result. This disclosure can be widely embodied in computer vision systems in the fields of national defense and military, film making, public security and the like.

Figure 5:
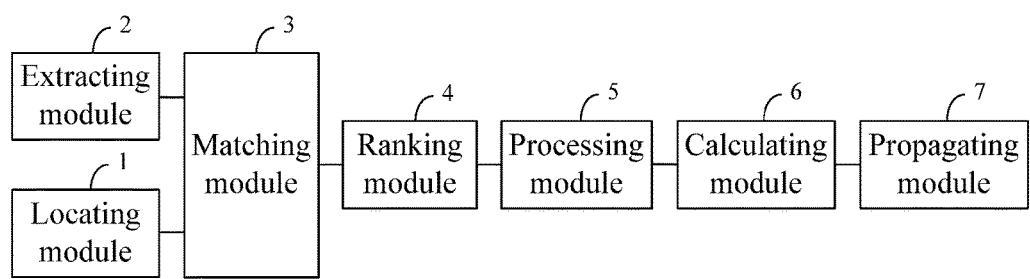
FIG. 5 is a schematic structural diagram illustrating an image guided video semantic object segmentation apparatus according to an exemplary embodiment of this disclosure.

FIG. 5 is a schematic structural diagram illustrating an image guided video semantic object segmentation apparatus according to an exemplary embodiment of this disclosure. As depicted in FIG. 5, the image guided video semantic object segmentation apparatus includes:

a locating module 1, configured to locate, according to a given semantic category, a target object corresponding to the semantic category in a sample image to obtain an object sample; an extracting module 2, configured to extract a candidate region from each frame in an input video; a matching module 3, configured to match, according to the object sample, multiple candidate regions extracted from the each frame with the object sample to obtain a similarity rating of each candidate region; a ranking module 4, configured to rank the similarity rating of each candidate region in each frame to select a predefined candidate region number of high rating candidate regions ranked by the similarity rating from high to low; a processing module 5, configured to preliminarily segment a foreground and a background from the selected high rating candidate region; a calculating module 6, configured to construct an optimization function for the preliminarily segmented foreground and background based on a consistent and unambiguous constraint for the foreground and background after the preliminary segmentation, and solve the optimization function to obtain a optimal candidate region set; and a propagating module 7, configured to propagate a preliminary foreground segmentation corresponding to the optimal candidate region to an entire video to obtain a semantic object segmentation of the input video.

An apparatus of this embodiment can be used to perform the technical solutions of the embodiment according to the image guided video semantic object segmentation method depicted in FIG. 1, following similar principals and producing similar technical effects, and neither of which will be repeated herein.

Further, on the basis of the above embodiment, the matching module 3 in the image guided video semantic object segmentation apparatus is particularly configured to determine, in the object sample, an image region visually similar to each candidate region in each frame; determine a relative coordinate and a size parameter for the image region in the sample image of the object sample; construct a new object region in a corresponding frame of the input video while preserving the relative coordinate and the size parameter; and rate each of the candidate region according to the constructed new object region to obtain the similarity rating of each candidate region.

Optionally, the processing module 5 is particularly configured to calculate a probability value for a foreground and a background of each superpixel in the high rating candidate region to obtain a preliminary foreground segmentation vector which is consist of foreground probabilities of all superpixel, and a preliminary background segmentation vector which is consist of background probabilities of all superpixel.

Optionally, the calculating module 6 is particularly configured to construct a first superpixel image for the input video; propagate the preliminary foreground segmentation vector and the preliminary background segmentation vector along the first superpixel image to the entire input video to obtain a post-propagation foreground and background segmentation vector; construct, according to the post-propagation foreground and background segmentation vector, a consistency constraint term and an unambiguity constraint term for the segmentation to form the optimization function; and solve, based on a greedy algorithm, the optimization function to obtain the optimal candidate region set.

Optionally, the propagating module 7 is particularly configured to select, according to a given number of video frames and a given number of the high rating candidate region in each frame, candidate region in the high rating candidate region to obtain a refined candidate region set, where the refined candidate region set comprises high rating candidate region at a number which equals to a product of the given number of video frames and the number of the high rating candidate region in each of the given frames; build a second superpixel image for the selected refined candidate region set; use a random walk algorithm to propagate the preliminary foreground segmentation corresponding to a candidate region in the refined candidate region set along the second superpixel image to obtain a post-propagation foreground probability distribution; take the post-propagation foreground probability distribution as a preliminary distribution to perform a secondary propagation on the first superpixel image of the input video based on the random walk algorithm to obtain a final superpixel foreground probability distribution; normalize the final superpixel foreground probability distribution; extract superpixel above a predefined threshold; and take the extracted superpixel as a semantic object segmentation result for the input video.

An apparatus of this embodiment can be used to perform the technical solutions of the embodiment according to the image guided video semantic object segmentation method depicted in FIG. 4, following similar principals and producing similar technical effects, and neither of which will be repeated herein.

Persons of ordinary skill in the art may understand that, all or a part of steps of the foregoing method embodiments may be implemented by a program instructing relevant hardware. The foregoing program may be stored in a computer readable storage medium. When the program runs, the steps of the foregoing embodiment methods are performed. The foregoing storage medium includes various mediums capable of storing program codes, such as a ROM, a RAM, a magnetic disk, or an optical disc.

Finally, it should be noted that the foregoing embodiments are merely intended for describing, rather than limiting, the technical solutions of the present disclosure. Although the present disclosure is described in detail with reference to the foregoing embodiments, persons of ordinary skill in the art should understand that it remains possible to make modifications to the technical solutions described in the foregoing embodiments, or make equivalent replacements to some or all technical features therein. However, these modifications or replacements do not make the essence of corresponding technical solutions depart from the scope of the technical solutions in the embodiments of the present disclosure.

What is claimed is:

1. An image guided video semantic object segmentation method, comprising:
    locating, according to a given semantic category, a target object corresponding to the semantic category in a sample image to obtain an object sample;
    extracting a candidate region from each frame in an input video;
    matching, according to the object sample, multiple candidate regions extracted from the each frame with the object sample to obtain a similarity rating of each candidate region;

ranking the similarity rating of each candidate region in each frame to select a predefined candidate region number of high rating candidate region ranked by the similarity rating from high to low;

preliminarily segmenting a foreground and a background from the selected high rating candidate region;

constructing an optimization function for the preliminarily segmented foreground and background based on a consistent and unambiguous constraint for the foreground and background after the preliminary segmentation, and solving the optimization function to obtain a optimal candidate region set; and propagating a preliminary foreground segmentation corresponding to the optimal candidate region to an entire video to obtain a semantic object segmentation of the input video.

2. The method according to claim 1, wherein the matching, according to the object sample, multiple candidate regions extracted from the each frame with the object sample to obtain a similarity rating of each candidate region comprises:

determining, in the object sample, an image region visually similar to each candidate region in each frame;

determining a relative coordinate and a size parameter for the image region in the sample image of the object sample;

constructing a new object region in a corresponding frame of the input video while preserving the relative coordinate and the size parameter; and rating each of the candidate region according to the constructed new object region to obtain the similarity rating of each candidate region.

3. The method according to claim 1, wherein the preliminarily segmenting a foreground and a background from the selected high rating candidate region comprises:

calculating a probability value for a foreground and a background of each superpixel in the high rating candidate region to obtain a preliminary foreground segmentation vector which is consist of foreground probabilities of all superpixel, and a preliminary background segmentation vector which is consist of background probabilities of all superpixel.

4. The method according to claim 3, wherein the constructing an optimization function for the preliminarily segmented foreground and background based on a consistent and unambiguous constraint for the foreground and background after the preliminary segmentation, and solving the optimization function to obtain a optimal candidate region set comprises:

constructing a first superpixel image for the input video, and propagating the preliminary foreground segmentation vector and the preliminary background segmentation vector along the first superpixel image to the entire input video to obtain a post-propagation foreground and background segmentation vector;

constructing, according to the post-propagation foreground and background segmentation vector, a consistency constraint term and an unambiguity constraint term for the segmentation to form the optimization function; and solving, based on a greedy algorithm, the optimization function to obtain the optimal candidate region set.

5. The method according to claim 1, wherein the propagating a preliminary foreground segmentation corresponding to the optimal candidate region to an entire video to obtain a semantic object segmentation of the input video comprises:

selecting, according to a given number of video frames and a given number of the high rating candidate region in each frame, candidate region in the high rating candidate region to obtain a refined candidate region set, wherein the refined candidate region set comprises high rating candidate region at a number which equals to a product of the given number of video frames and the number of the high rating candidate region in each of the given frames;

building a second superpixel image for the selected refined candidate region set, and using a random walk algorithm to propagate the preliminary foreground segmentation corresponding to a candidate region in the refined candidate region set along the second superpixel image to obtain a post-propagation foreground probability distribution;

taking the post-propagation foreground probability distribution as a preliminary distribution to perform a secondary propagation on the first superpixel image of the input video based on the random walk algorithm to obtain a final superpixel foreground probability distribution; and normalizing the final superpixel foreground probability distribution, and extracting superpixel above a predefined threshold; and taking the extracted superpixel as a semantic object segmentation result for the input video.

6. An image guided video semantic object segmentation apparatus, comprising:

a locating module, configured to locate, according to a given semantic category, a target object corresponding to the semantic category in a sample image to obtain an object sample;

an extracting module, configured to extract a candidate region from each frame in an input video;

a matching module, configured to match, according to the object sample, multiple candidate regions extracted from the each frame with the object sample to obtain a similarity rating of each candidate region;

a ranking module, configured to rank the similarity rating of each candidate region in each frame to select a predefined candidate region number of high rating candidate region ranked by the similarity rating from high to low;

a processing module, configured to preliminarily segment a foreground and a background from the selected high rating candidate region;

a calculating module, configured to construct an optimization function for the preliminarily segmented foreground and background based on a consistent and unambiguous constraint for the foreground and background after the preliminary segmentation, and solve the optimization function to obtain a optimal candidate region set; and a propagating module, configured to propagate a preliminary foreground segmentation corresponding to the optimal candidate region to an entire video to obtain a semantic object segmentation of the input video.

7. The apparatus according to claim 6, wherein:

the matching module is particularly configured to determine, in the object sample, an image region visually similar to each candidate region in each frame; determine a relative coordinate and a size parameter for the image region in the sample image of the object sample; construct a new object region in a corresponding frame of the input video while preserving the relative coordinate and the size parameter; and rate each of the candidate region according to the constructed new object region to obtain the similarity rating of each candidate region.

8. The apparatus according to claim 6, wherein:
the processing module is particularly configured to calculate a probability value for a foreground and a background of each superpixel in the high rating candidate region to obtain a preliminary foreground segmentation vector which is consist of foreground probabilities of all superpixel, and a preliminary background segmentation vector which is consist of background probabilities of all superpixel.

9. The apparatus according to claim 8, wherein:
the calculating module is particularly configured to construct a first superpixel image for the input video; propagate the preliminary foreground segmentation vector and the preliminary background segmentation vector along the first superpixel image to the entire input video to obtain a post-propagation foreground and background segmentation vector; construct, according to the post-propagation foreground and background segmentation vector, a consistency constraint term and an unambiguity constraint term for the segmentation to form the optimization function; and solve, based on a greedy algorithm, the optimization function to obtain the optimal candidate region set.

10. The apparatus according to claim 6, wherein:
the propagating module is particularly configured to select, according to a given number of video frames and a given number of the high rating candidate region in each frame, candidate region in the high rating candidate region to obtain a refined candidate region set, wherein the refined candidate region set comprises high rating candidate region at a number which equals to a product of the given number of video frames and the number of the high rating candidate region in each of the given frames; build a second superpixel image for the selected refined candidate region set; use a random walk algorithm to propagate the preliminary foreground segmentation corresponding to a candidate region in the refined candidate region set along the second superpixel image to obtain a post-propagation foreground probability distribution; take the post-propagation foreground probability distribution as a preliminary distribution to perform a secondary propagation on the first superpixel image of the input video based on the random walk algorithm to obtain a final superpixel foreground probability distribution; normalize the final superpixel foreground probability distribution; extract superpixel above a predefined threshold; and take the extracted superpixel as a semantic object segmentation result for the input video.

* * * * *